United States Patent
Jeliazkov

(10) Patent No.: US 11,036,680 B2
(45) Date of Patent: Jun. 15, 2021

(54) SYSTEM AND METHOD FOR SCOUTING DISTRIBUTED FILE SYSTEM METADATA

(71) Applicant: PayPal, Inc., San Jose, CA (US)

(72) Inventor: Plamen Jeliazkov, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 232 days.

(21) Appl. No.: 16/020,452

(22) Filed: Jun. 27, 2018

(65) Prior Publication Data

US 2019/0347336 A1 Nov. 14, 2019

Related U.S. Application Data

(60) Provisional application No. 62/669,825, filed on May 10, 2018.

(51) Int. Cl.
  *G06F 16/14* (2019.01)
  *G06F 16/182* (2019.01)
(52) U.S. Cl.
  CPC .......... *G06F 16/156* (2019.01); *G06F 16/148* (2019.01); *G06F 16/182* (2019.01)
(58) Field of Classification Search
  CPC .... G06F 16/148; G06F 16/182; G06F 16/156; G06F 17/30
  USPC ........................................................ 707/722
  See application file for complete search history.

(56) References Cited

U.S. PATENT DOCUMENTS

| | | | |
|---|---|---|---|
| 10,037,339 B1* | 7/2018 | Kleinpeter | G06F 16/152 |
| 10,606,855 B2* | 3/2020 | Pattabhiraman | G06F 16/248 |
| 2005/0262087 A1* | 11/2005 | Wu | G06F 16/21 |
| 2011/0066668 A1* | 3/2011 | Guarraci | G06F 16/27 707/831 |
| 2014/0059310 A1* | 2/2014 | Du | G06F 11/2094 711/162 |
| 2015/0112969 A1* | 4/2015 | Prabhu | G06Q 10/06 707/722 |
| 2016/0034356 A1* | 2/2016 | Aron | G06F 11/1435 707/649 |
| 2016/0034544 A1* | 2/2016 | Ramanujan | G06F 16/248 707/722 |
| 2016/0267110 A1* | 9/2016 | deValk | G06F 16/25 |

* cited by examiner

*Primary Examiner* — Hicham Skhoun
(74) *Attorney, Agent, or Firm* — Haynes and Boone, LLP

(57) ABSTRACT

Aspects of the present disclosure involve, a customizable system and infrastructure which can used to retrieve and scout metadata on a distributed file system for data management. In one embodiment, a system is introduced which can be used to scout metadata from a distributed file system using an isolated node which can enable the determination and response to customized queries. The customizable system can include a NameNodeAnalytics module which can stream, filter, and process client queries without locking the NameNode in the distributed file system. In another embodiment, the analytics distributed file system can communicate with a streaming API and other time-series module for the reporting and visual representation of the metrics obtained.

20 Claims, 8 Drawing Sheets

SYSTEM AND METHOD FOR SCOUTING DISTRIBUTED FILE SYSTEM METADATA

CROSS REFERENCED TO RELATED APPLICATIONS

This application claims priority to U.S. Provisional Patent Application Ser. No. 62/669,825, filed on May 10, 2018, the contents of which are incorporated by reference in its entirety.

TECHNICAL FIELD

The present disclosure generally relates to distributed file systems, and more specifically, to the use of the use of distributed data system metadata for scouting.

BACKGROUND

Nowadays millions and millions of electronic transactions occur on a daily basis. As such, a large amount of data and files are often maintained as directory trees with all files stored in a distributed file system. The distributed file system may maintain and track these files across the cluster that the file data is kept. In some instances, NameNodes are used as the intelligence of the file system, where various applications can communicate with the NameNode for the location and information about a file. The NameNode, however is often limited in functionality which can lead to large lag times before file details may be retrieved. In addition, the status of the files, size, and other relevant information is not easily attainable. Thus, such delay and lack of file status can lead to the loss of millions of dollars as cluster of possibly irrelevant data is collected and time is accumulated before information about the files is known. Therefore, it would be beneficial to create a system and method that is capable of scouting the file information located in the distributed file system for better file management.

Figure 1:
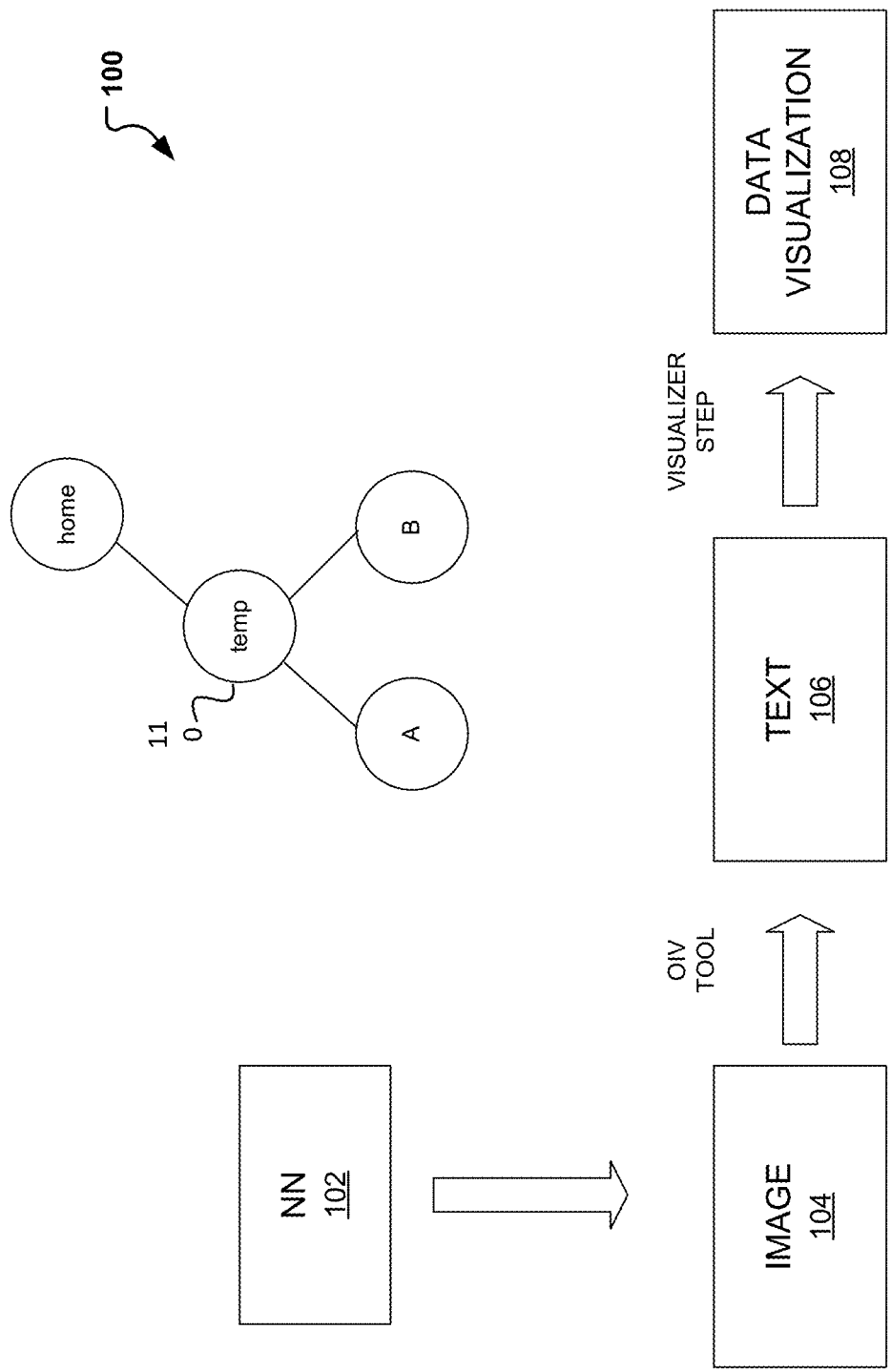
FIG. 1 illustrates an exemplary diagram of distributed file system.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve, a customizable system and infrastructure which can used to retrieve and scout metadata on a distributed file system for data management. In one embodiment, a system is introduced which can be used to scout metadata from a distributed file system using a modified, isolated, read-only node which can enable the determination and response to customized queries. The customizable system can include a NameNodeAnalytics module which can stream, filter, and process client queries without locking the NameNode in the distributed file system. In another embodiment, the analytics distributed file system can communicate with a streaming API and other time-series module for the reporting and visual representation of the metrics obtained.

Nowadays with the large amount of data that is processed, collected and used, institutions are commonly using distributed file systems (DFS) for storing data. A distributed file system is a file system with data stored on a server, where the data may be accessed or processed as if it were stored on a local computing machine. DFS are commonly used as a convenient way to share information and files on a network with full data control. NameNode, is an architectural component in a DFS system used to maintain the file system tree and the metadata of the files and directories present in the system. For example, consider FIG. 1, a general distributed system 100 is presented. At FIG. 1, a NameNode (NN) 102 illustrated and used for the storage and maintenance of a file tree 110. The file tree, as commonly understood, may include a home directory, directories (e.g., temp) and several files residing within the directories (e.g., A, B). A large system like a DFS contains millions of files and thus file trees 110 stored in the NN 102. In a conventional DFS, to access a tree and its contents, generally simple (e.g., 1s) commands, may be run which can provide details on files and data on a branch of the file tree 110. This however, is limited to a single directory and its contents at a time. Alternatively, to obtain a scan of the entire file tree 110 and/or the DFS system 102, a data dump of a snapshot in time may be taken. This snapshot in time includes freezing the file tree 110 at the time and dumping or writing out its contents into an image 104. The image 104, when it gets written out can take up to half an hour to write. Upon obtaining the image, the information generally written in binary format needs to be processed and converted to text 106. To process the data, an off-line viewer tool (OVI) may be used and the process can take over 45 minutes. Once the image is converted to text, the text data then goes into a data visualizing step, where a data warehouse software (e.g., HIVE, Elastic Search, Cabana) can facilitate the visualizing, reading, writing, and managing of the data. As such, a data file management in a DFS is very limited, either to the directory level, and/or only accessible on a time interval basis using image and data visualization techniques which can take over 2 hours to obtain. Therefore, it would be beneficial to introduce a system and method that can scout distributed file system metadata for faster and easier file data management.

Figure 2:
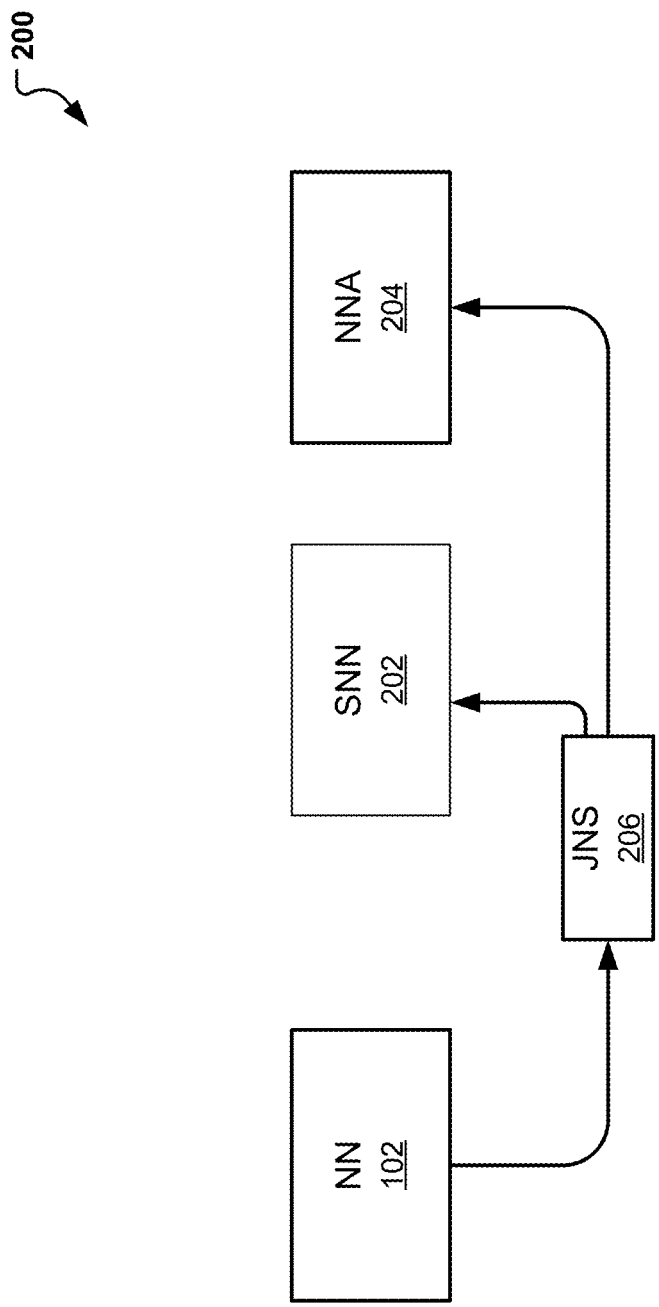
FIG. 2 illustrates an exemplary diagram of a distributed file system for scouting metadata.

In one embodiment, FIG. 2 is introduced which illustrates an exemplary diagram of a distributed file system for scouting metadata. As illustrated in FIG. 2, analytical DFS 200 is illustrated which provides additional exemplary NameNodes which contain the in-memory data set. For example, the analytical DFS 200 can include a standby NameNode (SNN) 202, which as the name indicates, is a standby architecture with a replica of the in-memory data set design to provide back-up if a malfunction occurs with the main NN 102. Therefore, if NN 102 is unable to operate or the NN 102 dies, SNN 202 may be used. In some embodiments, both the NN 102 and SNN 202 have the same in memory data set and are synchronized at all times.

To ensure both systems (e.g., NN 102 and SNN 202) are in sync, a quorum or group of machines can exist to facilitate this. The group of machines, referred herein as journal nodes JNS 206, are nodes design to journal or keep log entries of changes in files. Thus, any changes occurring at the NN 102 is written on the JNS 206 and is read and updated at the SNN 202. However, because the SNN 202 is a standby NameNode 202 which needs to be available in case of NN 102 malfunction, changes to the files, updates, or other management will hold up the NN 102 system. In addition, in order to query in near real-time, the NN 102 would need constant updating.

Therefore, another node is introduced which can perform the analytics. In one embodiment, a NameNodeAnalytics 204 is presented which can operate as a constantly updating namenode which contains the same in-memory data set present and available at NN 102 and SNN 202. The NNA 204 can therefore be used for reading, understanding, and determining how to manipulate the data in the NN 102 without having to lock up (or modify what is occurring in) the NN 102, while determining the status of the files and data in the NN 102. NNA 204 provides a mechanism for obtaining real-time data statistics. In other words, file sizes, types of files, dates files are created, empty files, etc., can be identified via the use of the NNA 204 without disturbing the processing at the NN 102.

In order to generate the real-time NN 102 statistics and effectively filter and/or query the system, parallel processing is used. For this, the NNA 204 can communicate with a runtime environment (e.g., Java 8) which may be equipped with a streaming application streaming interface (API) available with a multi-core, multi-central processing unit (CPU) for processing on top of the in-memory datasets found in the NNA 204. Thus, the NNA 204 in conjunction with the runtime environment can obtain metrics related to the in-memory data set for better data management of the analytics distributed file system 200. To obtain the metrics, the in-memory dataset or tree is converted into information which can be computed on. In other words, a stream of the tree can be obtained using the runtime environment. In the conversion of the in-memory tree, each of the entries or nodes are being considered and converted. Therefore, each of the files are considered (and not lost as can occur in conventional imaging as described above and in conjunction with FIG. 1) during the analysis. Once the data stream is available, filters and/or policies can be added in order to obtain the metric under consideration. The filters provide the relevant data and the data can then be mapped based on the criteria set. For example, if the criteria is to identify files older than two years, a filter may be added after the data is streamed, and then those files identified can be mapped and even summed to provide a visual representation of the results obtained. As another example, the streamed data may be filtered by storage type and mapped, an option not previously available as some of the metadata was lost during the conversion from binary to plain text format in the conventional scheme. Therefore, the NNA 204 in conjunction with the runtime environment, can provide the ability to add various filters, target information, remove, update, and dump list details without locking up the NN 102 and as modified, isolated, read-only standby analytics NameNode. Further, because the NNA 204 is working as an isolated environment, it may be used as a plug-in or in conjunction with a time-series reporting environment for the presentation of the metrics and if any issues arise at the NNA 204 or it malfunctions, the NN 102 is not disturbed.

Figure 3:
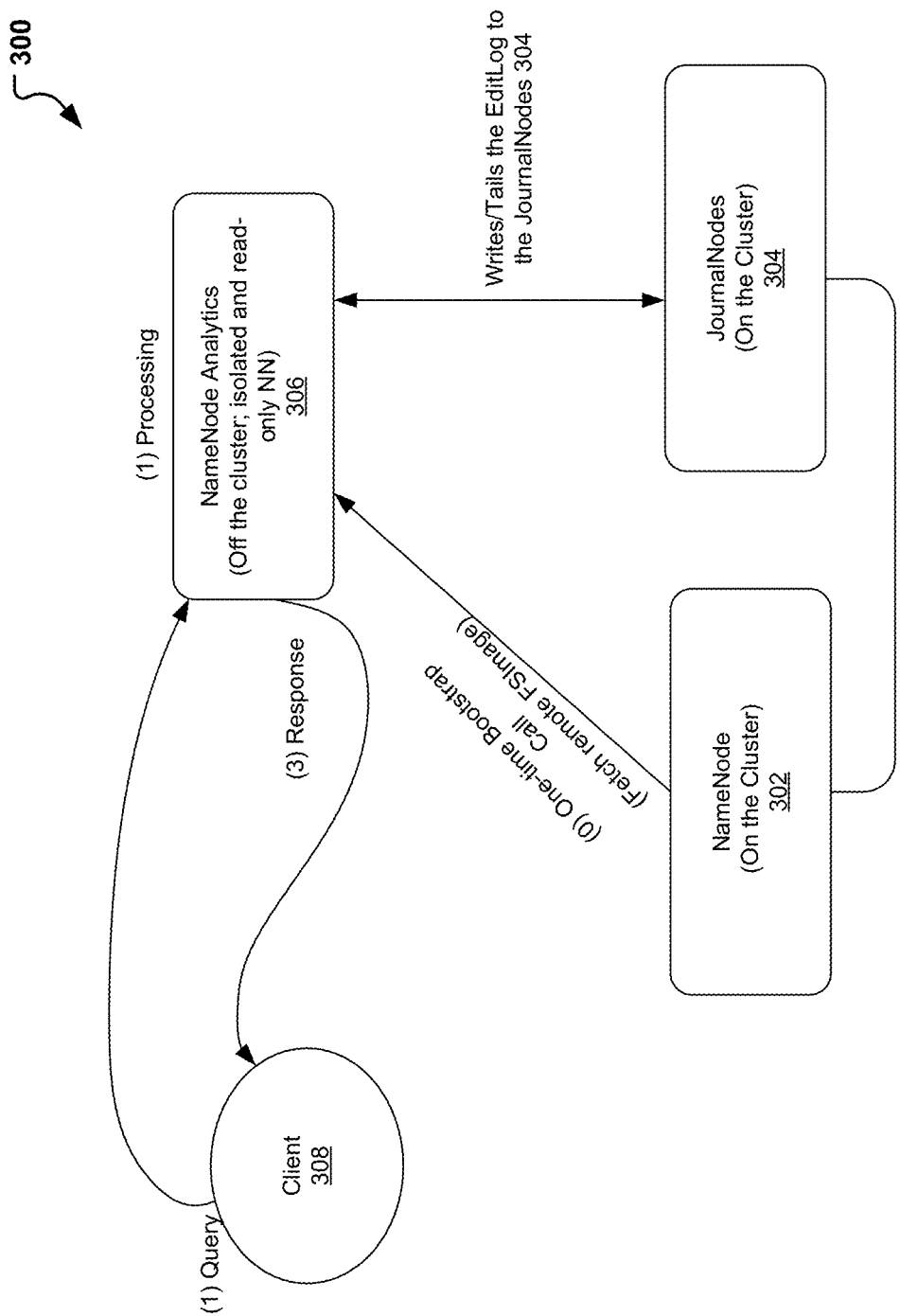
FIG. 3 illustrates an exemplary diagram of another distributed file system for scouting metadata

Turning to FIG. 3, another representation of the analytics distributed file system 300 where a client 308 is now querying the NNA 306 for file metrics regarding the in-memory data set located in the NameNode 302 and replicated in the Standby NameNode (not shown) via the use of the Journal Nodes 304. FIG. 3, specifically illustrates a high-level overview of the communication that may occur between the nodes and client(s). As illustrated, the communication can begin with a call from the NN 302 to the NNA 306. The call may be a one-time Boostrap call which is used to fetch the remote image. One the call is placed, and information transferred, the NNA may begin communicating and receiving queries about the metadata. For example, client 308 can transmit a query, request, command, etc. from the NNA 306. In response, the NNA 306 in conjunction with a streaming API gather the information, filter, and map the details in a response to the client. Additionally, or concurrently, an EditLog may be maintained and updated in a communication between the NNA 306 and the JournalNodes 304. To understand the processes involved within the NNA to obtain the queried information, FIG. 4 presents an exemplary architecture of the NNA 204 and consequently NNA 306.

Figure 4:
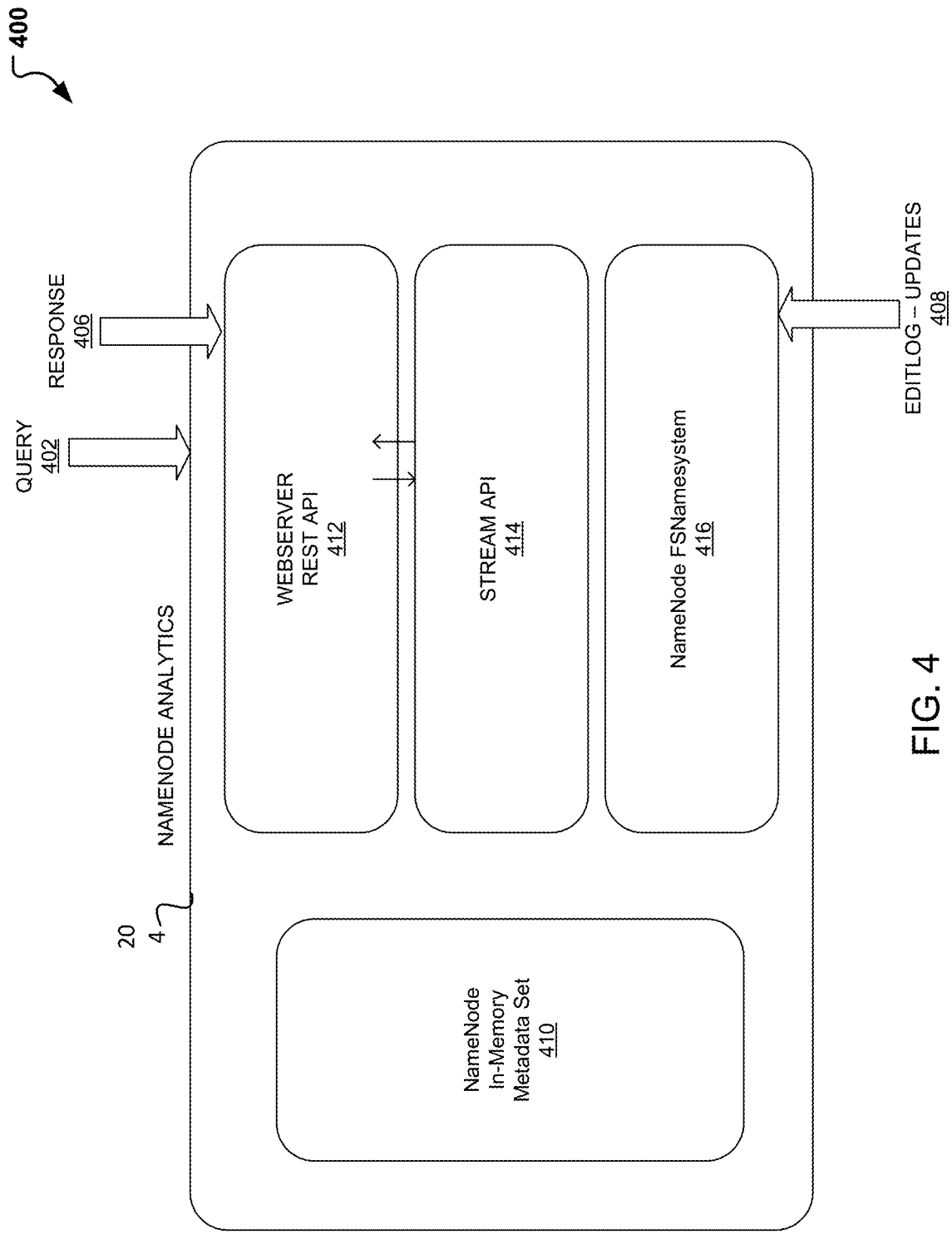
FIG. 4 illustrates an exemplary implementation of name node analytics architecture.

As illustrated in FIG. 4, the NNA module 204 is illustrated where as described above and in conjunction with FIG. 3, a query 402 is received from a client 308 and after the data mapping, a response 406 is generated and transmitted. In one embodiment, inside the NNA 204, the replicated NameNode In-memory metadata set 410 may reside in storage. Additionally, Web Server 412, Stream API 414, and NameNode FSNameSystem 416 modules may also reside within the architecture of the NNA 204. Alternatively, the one or more of modules 410-416 may exist external to the NNA 204 with a direct link or communication to the NNA 204. At the Webserver 412, a REST API may exist which will allow the communication between the web-based client and the server which can service any system constraints. In communication with the Webserver 412 is the Stream API 414. The Stream API 414 as previously indicate can be used to convert the information tree into a manageable stream of data which can then be filtered, mapped, and at times summed. In other words, the Stream API 414, may be used for query processing. Further to the Stream API 414, a NameNode FSNameSystem 416 can also exist. The NameNode FSNameSystem 416 can be module with a class or set of classes which the namenode functions. For example, in the NameNode FSNameSystem 416, image loading, EditLog tailing/updating and communication with the JournalsNodes 304 is possible.

Note that further to the use of the nodes illustrates and components illustrated, other pluggable containers, modules, nodes, and components may be added and customized.

Additionally, other APIs, servers, and functions may also be used in addition to the modules illustrated on FIGS. 2-4.

Figure 5:
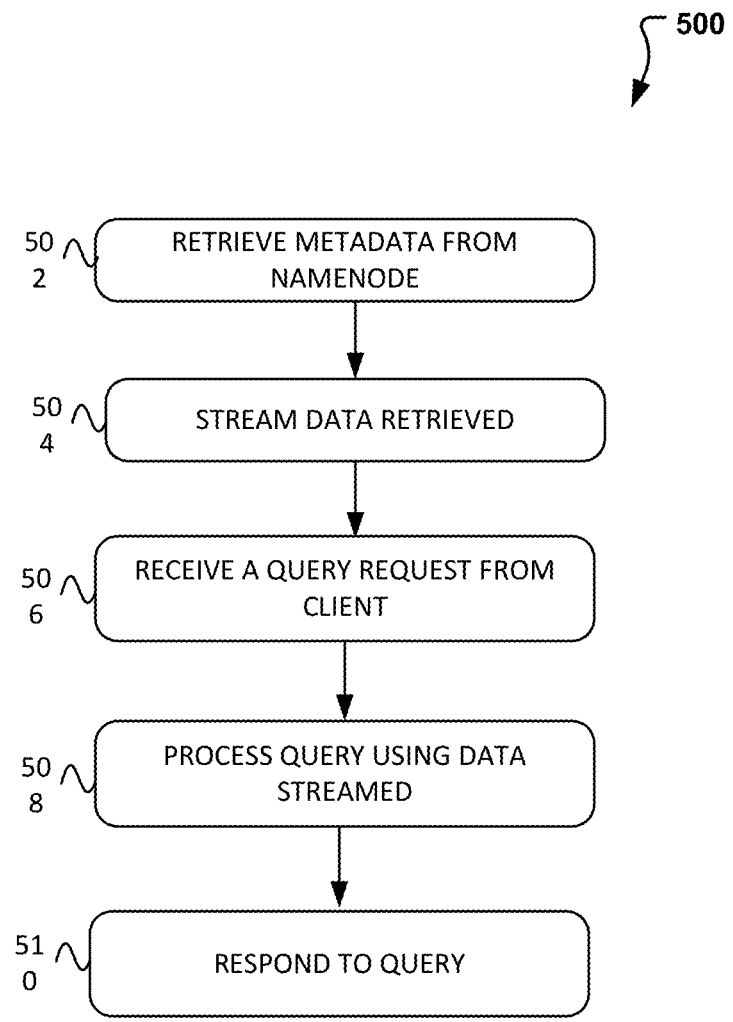
FIG. 5 illustrates a flow diagram illustrating operations for scouting distributed file system metadata.

To illustrate how NameNodeAnalytics may be used for scouting metadata in a distributed files system, the overall process is presented in FIG. 5. In particular, FIG. 5 illustrates a flow diagram illustrating operations for scouting and reporting on metadata. According to some embodiments, process 500 may include one or more of operations 502-510, which may be implemented, at least in part, in the form of executable code stored on a non-transitory, tangible, machine readable media that, when run on one or more hardware processors, may cause a system to perform one or more of the operations 502-510.

Process 500 may begin with operation 502, where data is retrieved from the distributed file system NameNode. As previously indicated, in order to alleviate data lock-up, system delays, and provide real-time data analytics, a NameNodeAnalytics is introduced which may be used to perform analytics on. The NameNodeAnalytics 204 is presented which can operate as a constantly updating NameNode which contains the same in-memory data set present and available at NN 102 and SNN 202. The NNA 204 can therefore be used for reading, understanding, and determining how to manipulate the data in the NN 102 without having to lock up (or modify what is occurring in) the NN 102, while determining the status of the files and data in the NN 102. Therefore, at operation 502, the NNA 204 retrieves the in-memory data set from the NN 102.

At operation 504, the in order for the NNA 204 to effectively query and filter the data set, the NNA first converts the dataset or tree into information on which it can compute on. That is to say, at operation 504, the NNA in conjunction with a streaming application convert the data retrieved into a stream of the tree using the run-time environment. In the conversion of the in-memory tree, each of the entries or nodes are being considered and converted. Therefore, each of the files are considered (and not lost as can occur in conventional imaging as described above and in conjunction with FIG. 1) during the analysis. Once the data stream is available, filters and/or policies can be added in order to obtain the metric under consideration.

Therefore, at operation 506, a query providing a criteria to be met and statistic desired is received at the NNA 204. At the NNA 204, filters may be applied such that relevant data may be mapped based on the query received. For example, at operation 506, a query may be received from a client with a request for one or more metrics or analysis to be performed on the current data that was retrieved and converted.

In response to the query received, process 500 may continue to operation 508, where the data stream is available, and filters and/or policies can be added in order to obtain the metric(s) under consideration. The filters provide the relevant data and the data can then be mapped based on the criteria set. For example, if the criteria is to identify files are small than a certain threshold size. These metrics can be obtained using a combination of the NameNodeFSNameSystem and the Stream API.

Figure 7:
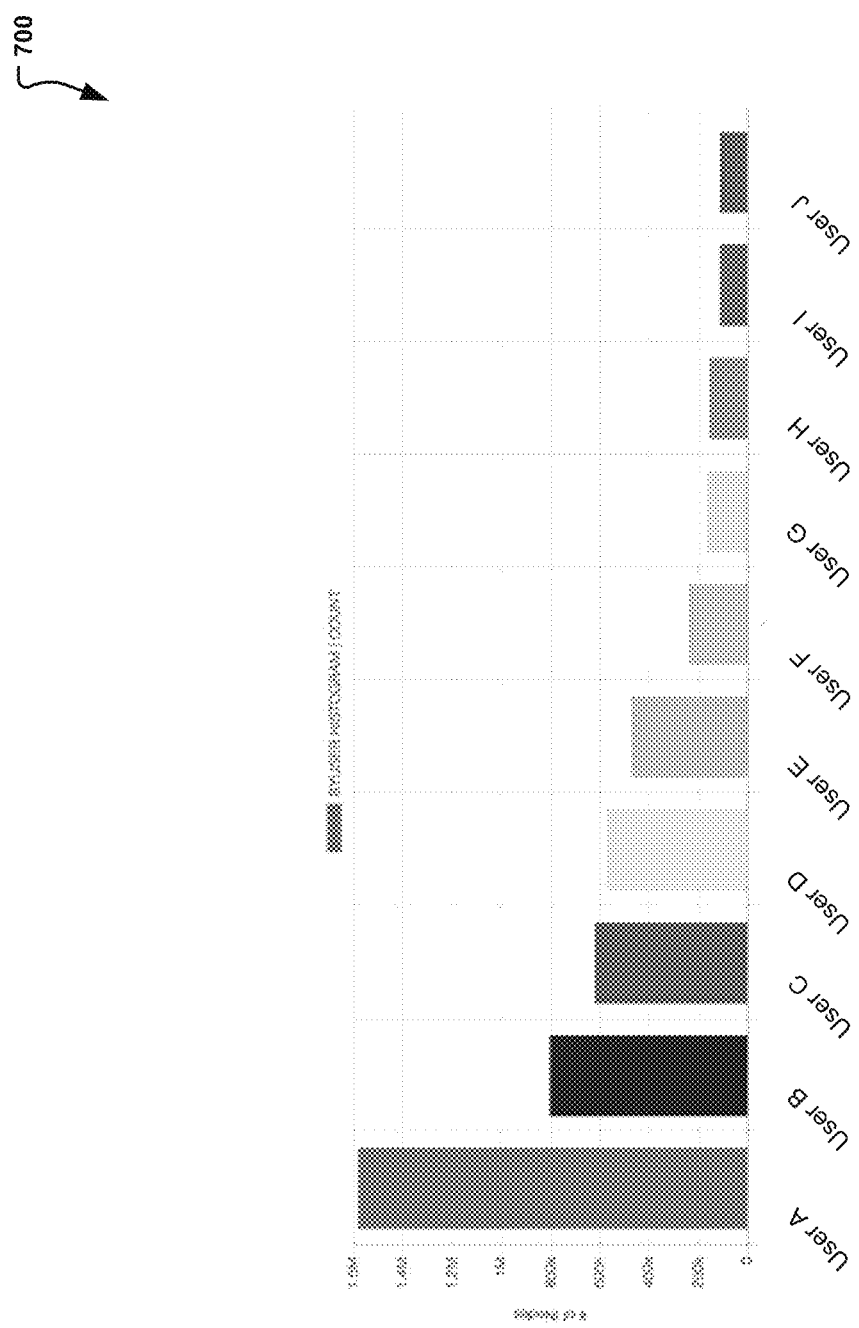
FIG. 7 illustrates a sample model run illustrating an empty file analysis.
Figure 8:
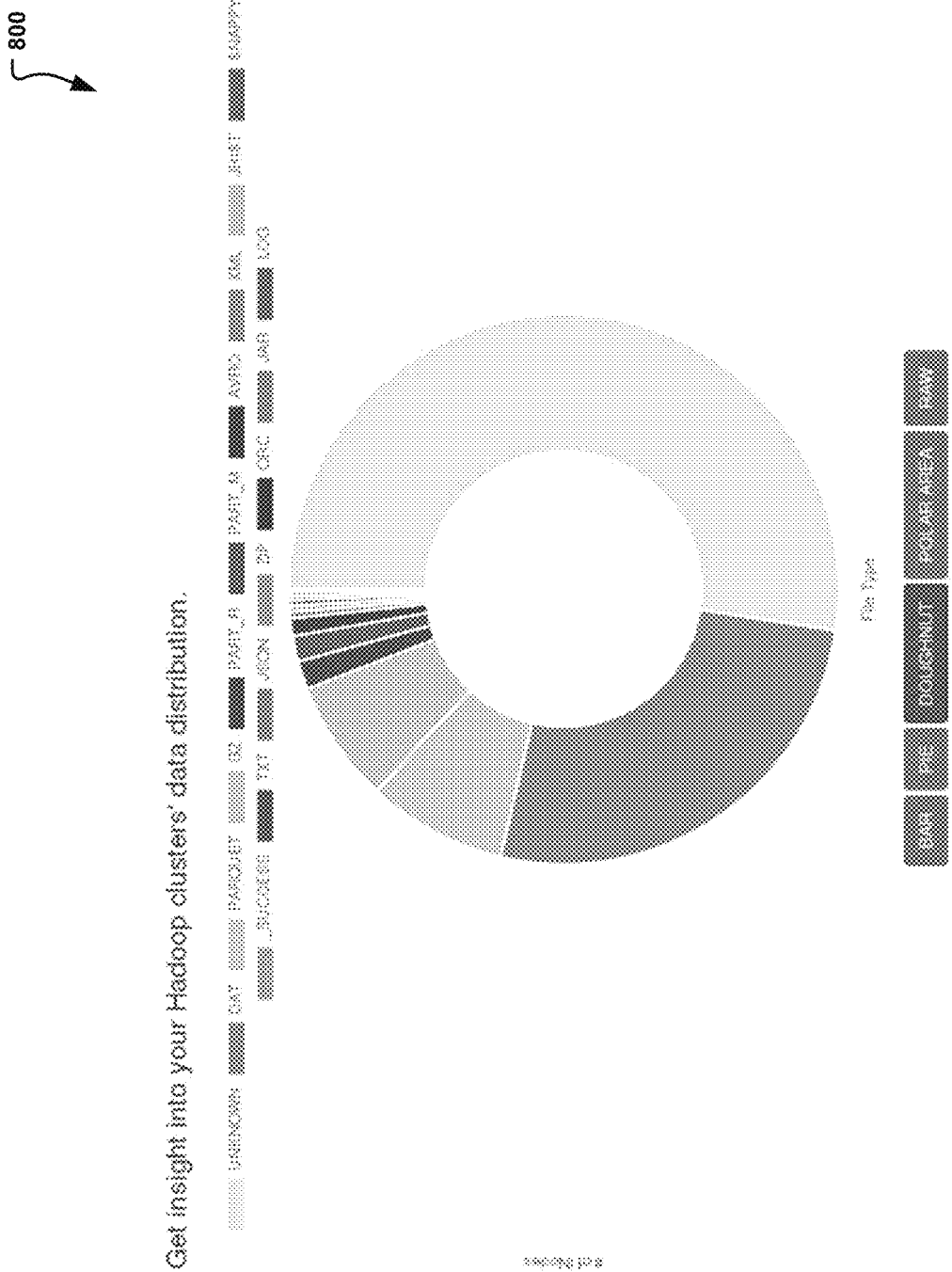
FIG. 8 illustrates another sample model run illustrating a file type analysis.

Once the data has been filtered accordingly and policies put in place to provide the metric(s) requested, the process 500 continues to respond to the query at operation 510. That is to say, at operation 510, plots, graphs, tables, statistics, charts, etc. may be created and presented to the user (client) who provided the query. The output plots, graphs, tables, statistics, charts, etc., can provide a wide variety of detail. As an example, FIGS. 7 and 8 are presented and described below to provide an illustration of the possible analysis available and output by the NNA 204. Note that in addition, all though operation 502-510 are generally included here, more or less operations may occur in the scouting and processing of metadata using an NNA 204.

Figure 6:
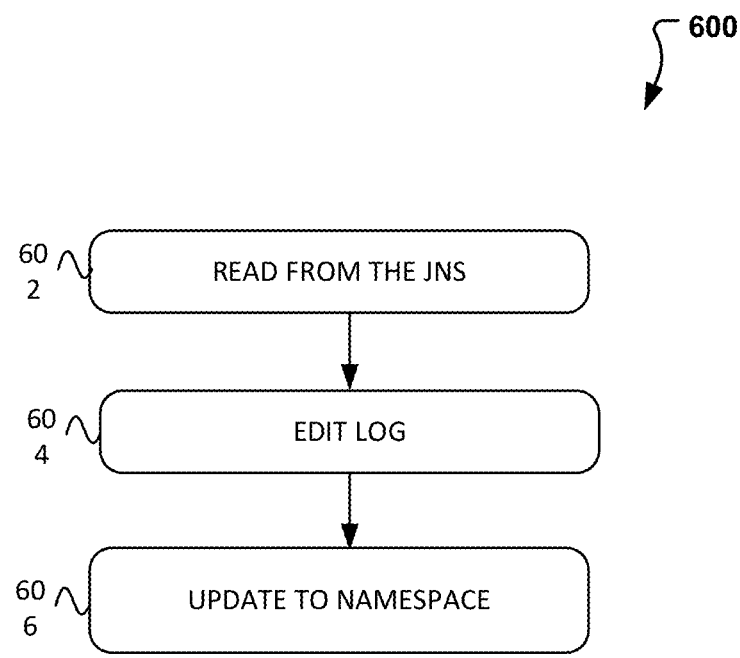
FIG. 6 illustrates another flow diagram illustrating operations for scouting distributed file system metadata.

To illustrate how NameNodeAnalytics may be used for scouting metadata in a distributed files system and how the NameNodeAnalytics may be used for retrieving the data from the namenode, FIG. 6. In particular, FIG. 6 illustrates a flow diagram illustrating operations for retrieving the metadata. According to some embodiments, process 600 may include one or more of operations 602-606, which may be implemented, at least in part, in the form of executable code stored on a non-transitory, tangible, machine readable media that, when run on one or more hardware processors, may cause a system to perform one or more of the operations 602-606.

As indicated, in order to remove the losses encountered by conventional namenode systems, a NameNodeAnalytics is introduced. This NameNodeAnalytics is designed to obtain a replica of the in-memory metadata of the main namenode in order to externally facilitate data analytics and clean-up. In order to obtain the replica of the metadata, the namenode and oftentimes a standby namenode include the in-memory data. In some embodiments, both the NN 102 and SNN 202 have the same in memory data set and are synchronized at all times.

To ensure both systems (e.g., NN 102 and SNN 202) are in sync, a quorum or group of machines can exist to facilitate this. The group of machines, referred herein as journal nodes JNS 206, are nodes design to journal or keep log entries of changes in files. Thus, any changes occurring at the NN 102 are written on the JNS 206 and is read and updated at the SNN 202. However, because the SNN 202 is a standby NameNode 202 which needs to be available in case of NN 102 malfunction, changes to the files, updates, or other management will hold up the NN 102 system. In addition, in order to query in near real-time, the NN 102 would need constant updating.

Now the NameNodeAnalytics 204 was presented which can operate as a constantly updating namenode which contains the same in-memory data set present and available at NN 102 and SNN 202. The NNA 204 can therefore be used for reading, understanding, and determining how to manipulate the data in the NN 102 without having to lock up (or modify what is occurring in) the NN 102, while determining the status of the files and data in the NN 102. NNA 204 provides a mechanism for obtaining real-time data statistics and respond to queries as described in process 500 and in conjunction with FIG. 5.

In order to generate the real-time NN 102 statistics and effectively filter and/or query the system, parallel processing is used. For this, the NNA 204 can communicate with a runtime environment (e.g., Java 8) which may be equipped with a streaming application streaming interface (API) available with a multi-core, multi-central processing unit (CPU) for processing on top of the in-memory datasets found in the NNA 204. Thus, the NNA 204 in conjunction with the runtime environment can obtain metrics related to the in-memory data set for better data management of the analytics distributed file system 200.

At process 600, operation 602 is introduced where the journal nodes may be read by the NNA 204. Thus, any updates or edits occurring at the NN 102 metadata is available and updated at the NNA 204. where the in-memory metadata is read from the journal nodes 206 where the log entries of changes in files are also maintained. Therefore, if for example a client transmits a query, request, command, etc., the NNA in response with a streaming API can gather the information based on the request and updates and filter and map the information accordingly.

Additionally, at operation 604, an EditLog may be maintained for edits in a communication between the NNA 306 and the JournalNodes 304. Consequently, any updates occur at operation 606. Note that in some instances, updates to and from the JournalNodes may occur at a different order in the process 600 and similarly, the response and other operations may also occur at a different instance.

In order to illustrate some of the possible analytics available using the NNA 204, FIGS. 7-8 are presented. In particular, FIGS. 7-8 illustrate sample reports, charts, statistics, and other metrics available through the use of NNA 204 for metadata scouting on a distributed file system. FIG. 7 begins with a sample graph output which may be presented to a user illustrating a summary of users with small files. As indicated, file clean-up and maintenance are tasks not conventionally available in real-time using a NN 102. However, using the NNA 204, a histogram illustrating users and file sizes is available using the analytics distributed file system 200. For example, in file histogram 700, a diagram is illustrated indicated a name of a user (e.g. user A-J) and a designation of the number of empty file each of the users may have. Thus, with histogram 700, an indication on the number of nodes/empty files, the users, and total space is available for clean-up can be gathered from the file histogram 700. Additionally, the information can be provided to the NN 102 and/or command sent to the NN 102 to either delete the empty files or communicate with the user of the empty file so that the server space can be recaptured. Note that FIG. 7 is for exemplary purposes only and various other types of histograms, charts, graphs, and visualizations are possible using the NNA 204. Additionally, other not only is file type analysis available, but other data may also be displayed using these graphs. For example, the NNA 204 may be used to filter any queried data and generate a corresponding histogram of any dimension.

Turning to FIG. 8, another sample graph is provided available using the analytics distributed file system 200. At FIG. 8, a doughnut graph a sample distribution is provided which indicates the various data distributions in the NN 102. In particular, doughnut chart 800 of FIG. 8 illustrates the distribution of each of the types of files existing in a sample NameNode. For example, in the doughnut graph 800, a large majority of the files in the analytics distributed file system 800 are of type unknown. Next, it can be determined that .dat files are the next large type of files with parquet files following and existing in the analytics distributed files system 200. In addition to those files indicated, other file types located in the analytics distributed file system 200 and/or any distributed file system, cluster, server, database, structure, etc. As an example, other file types or extensions can include but are not limited to gz, part_r, part_m, avro, WL, jhist, snappy, success, txt, json, zip, orc, jar, and log. Note that in addition to file types and/or extensions, a doughnut chart 800 may also be used to provide a graphical illustration of other files, metrics, and analytics for data management.

Note that although a histogram and a doughnut graph where used in FIGS. 7-8 for illustrated the reports and metrics available with the use of the NNA, this application is not so limited. For example, further to the use of histograms and doughnut graphs, pie, polar area, raw, bar, pie, line, 3D, scatter plots and the like may be used. In addition, FIGS. 7-8 presented exemplary file usage and type, however, the NNA is capable of performing other metrics, analytics, presentations, etc. For example, file replication, file size, disk space consumption, life listing, file dates, empty directories, and other metrics may be contemplated and obtained.

In addition to the parameters and metrics illustrated and applicable to the NNA 204 and analytics distributed file system 200, other capabilities are possible. For example, the analytics distributed file system 200 may be run in conjunction with a script on the NNA 204 such that a time stamp is provided on a file and/or other scripts which can automatically run for executing commands such as notifying a production machine to delete a file and then using the NNA 204 to ensure the file is deleted. Additionally, or alternatively, the analytics distributed file system 200 can also be implemented such that web tokens are supported to maintain sessions. Note that other NNA 204 has the capacity to work as a plug-in, install as part of an integration package, and provide other file management services which may be later contemplated.

Further, where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise be presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A distributed file system comprising:
   a non-transitory memory storing instructions; and
   one or more hardware processors coupled to the non-transitory memory and configured to execute the instructions to cause the distributed file system to perform operations comprising:
   receiving, by an analytics namenode different from a primary namenode, metadata associated with a distributed file system, wherein the primary namenode is configured to process client requests for accessing data stored in the distributed file system;

analyzing, by the analytics namenode, the distributed file system based on the metadata without interruption of processing of the client requests at the primary namenode;

generating, by the analytics namenode, analytical data associated with a structure of the distributed file system based on the analyzing; and causing, by the analytics namenode, the primary namenode to perform an action on at least one file in the distributed file system based on the analytical data.

2. The distributed file system of claim 1, wherein the operations further comprise:
receiving, by the analytics namenode, updates to the metadata from a journal namenode; and
updating the metadata based in part on the updates received from the journal namenode.

3. The distributed file system of claim 1, wherein the operations further comprise generating a data stream representing data files in the distributed file system, wherein the data stream indicates a tree structure of the data files in the distributed file system.

4. The distributed file system of claim 3, wherein the operations further comprise applying at least one filter to the data stream based on a user-defined criteria, and wherein the analytical data is generated based on the applying the at least one filter to the data stream.

5. The distributed file system of claim 1, wherein the performing the action to the at least one file comprises removing the at least one file from the distributed file system, and wherein the operations further comprise presenting a visual representation of the analytical data.

6. The distributed file system of claim 5, wherein the visual representation includes a graph displaying metrics generated in response to a user-submitted query.

7. The distributed file system of claim 2, wherein the operations further comprise:
generating a log indicating one or more edit operations performed on the metadata based on the updates.

8. A method comprising:
receiving, by an analytics namenode from a primary namenode, metadata associated with a distributed file system;
converting, by the analytics namenode using a streaming application, the metadata into a data stream of data files in the distributed file system, wherein the data stream indicates a tree structure of the data files;
processing, by the analytics namenode, a query using the converted data stream without interruption of operations at the primary namenode;
generating, by the analytics namenode, analytical data associated with the files in the distributed file system based on the processing;
presenting, by the analytics namenode, a visual representation of the analytical data as a response to the query; and
causing, by the analytics namenode, the primary namenode to perform an action on at least one file in the distributed file system based on the analytical data.

9. The method of claim 8, further comprising:
receiving, by the analytics namenode, an update to the metadata from a journal namenode; and
updating the metadata based in part on the update received from the journal namenode.

10. The method of claim 8, wherein the converting of the metadata occurs via a communication link between the analytics namenode and a streaming application.

11. The method of claim 8, wherein the processing the query comprises applying one or more policies to the converted data stream based on a criteria indicated in the query.

12. The method of claim 8, wherein the visual representation is presented on a time-series reporting environment, and wherein the time-series reporting environment is in communication with the analytics namenode.

13. The method of claim 12, wherein the visual representation includes a graph displaying metrics generated in response to the query received.

14. The method of claim 9, further comprising:
generating a log indicating one or more edit operations performed on the metadata based on the update.

15. A non-transitory machine-readable medium having stored thereon machine-readable instructions executable to cause a machine to perform operations comprising:
receiving, by an analytics namenode different from a primary namenode of a distributed file system, metadata associated with the distributed file system, wherein the primary namenode is configured to process client requests for accessing data stored in the distributed file system;
analyzing, by the analytics namenode, the distributed file system based on the metadata without interruption of processing the client requests by the primary namenode;
generating, by the analytical namenode, analytical data associated with a structure of the distributed file system based on the analyzing; and
causing, by the analytics namenode, the primary namenode to perform an action on at least one file in the distributed file system based on the analytical data.

16. The non-transitory machine-readable medium of claim 15, wherein the operations further comprise:
receiving, by the analytics namenode, one or more updates to the metadata from a journal namenode; and
updating, by the analytics namenode, the metadata based in part on the one or more updates received from the journal namenode.

17. The non-transitory machine-readable medium of claim 15, wherein the performing the action to the at least one file comprises deleting the at least one file from the distributed file system.

18. The non-transitory machine-readable medium of claim 15, wherein the analyzing the distributed file system comprises applying one or more filters to the converted data stream based on a user-defined criteria.

19. The non-transitory machine-readable medium of claim 15, wherein the operations further comprise presenting a visual representation of the analytical data on a time-series reporting environment.

20. The non-transitory machine-readable medium of claim 19, wherein the visual representation includes a graph displaying metrics generated in response to a user-submitted query.

* * * * *